(12) United States Patent
Baccouche et al.

(10) Patent No.: US 8,177,292 B1
(45) Date of Patent: May 15, 2012

(54) VEHICLE STRUCTURAL ARRANGEMENT FOR ENHANCED ROOF STRENGTH

(75) Inventors: Ridha Baccouche, Ann Arbor, MI (US); Saied Nusier, Canton, MI (US); David Anthony Wagner, Northville, MI (US)

(73) Assignee: Ford Global Technologies, Dearborn, MI (US)

( * ) Notice: Subject to any disclaimer, the term of this patent is extended or adjusted under 35 U.S.C. 154(b) by 0 days.

(21) Appl. No.: 12/978,440

(22) Filed: Dec. 24, 2010

(51) Int. Cl.
*B62D 25/02* (2006.01)

(52) U.S. Cl. .......... 296/193.06; 296/203.03; 296/187.12

(58) Field of Classification Search ............. 296/193.06, 296/203.03, 205, 186.1, 30, 202, 187.12
See application file for complete search history.

(56) References Cited

U.S. PATENT DOCUMENTS

| | | | | |
|---|---|---|---|---|
| 4,470,619 | A | * | 9/1984 | Imajyo et al. ............... 280/808 |
| 5,246,264 | A | * | 9/1993 | Yoshii ...................... 296/203.03 |
| 5,692,797 | A | * | 12/1997 | Dancasiu ................. 296/187.12 |
| 6,129,410 | A | | 10/2000 | Kosaraju |
| 6,189,953 | B1 | * | 2/2001 | Wycech ................... 296/187.02 |
| 6,328,376 | B2 | | 12/2001 | Son |
| 6,341,467 | B1 | * | 1/2002 | Wycech .......................... 52/834 |
| 7,510,234 | B2 | | 3/2009 | Ameloot |
| 2009/0309387 | A1 | | 12/2009 | Goral |
| 2010/0181802 | A1 | * | 7/2010 | Schmidt et al. .......... 296/193.06 |

* cited by examiner

*Primary Examiner* — Dennis Pedder
(74) *Attorney, Agent, or Firm* — Gigette Bejin; Fredrick Owens

(57) ABSTRACT

A vehicle structural arrangement 10 is provided which provides improved roof strength and controlled energy absorption when a load is imposed on the roof structure 60. The vehicle structural arrangement includes an inner panel 12, an outer panel 14 and at least one bridge member 16 having a first region 32, a second region 34, and a middle region 36. The middle region 36 may be disposed between and is integral to the first region 32 and the second region 34. The first region 32 of the middle portion abuts the inner panel and the second region 34 of the middle portion abuts the outer panel.

4 Claims, 4 Drawing Sheets

US 8,177,292 B1

VEHICLE STRUCTURAL ARRANGEMENT FOR ENHANCED ROOF STRENGTH

BACKGROUND

The present disclosure generally relates to a vehicle roof structure and vehicle occupant protection. More particularly, the present disclosure relates to a vehicle structure bridge for reinforcing a B-Pillar of a motor vehicle to facilitate enhanced roof strength.

In a conventional motor vehicle as shown in FIG. 1, a plurality of pillar assemblies 1 which are located on a left side and a right side of a vehicle body along a lengthwise direction of the body, function to support a roof 2 at a predetermined height from a floor and to hold front and rear doors 3 and 4 each of which is installed between two pillar assemblies 1.

Referring to FIG. 2, among the plurality of pillar assemblies 1, an example of a center pillar assembly which connects the roof 2 and the floor with each other between the front and rear doors 3 and 4, is illustrated.

As can be readily seen from FIG. 2, the center pillar assembly of the prior art includes outer and inner panels 6 and 11 which are joined with each other in such a way as to delimit a closed space therebetween and connect the roof 2 and the floor with each other, and a reinforcing panel 8 which is disposed in the closed space defined between the outer and inner panels 6 and 11 in such a way as to reinforce rigidity of the center pillar assembly.

The outer panel 6 has an upper end portion 7 and a lower end portion which are integrated with a side frame of the vehicle body. The upper end portion 7 of the outer panel 6 is formed in a manner such that it projects outward and upward to correspond to a contour of an upper portion of the side frame. A flange portion which is formed on an upper end of the outer panel 6, is joined to a flange portion of a roof panel 15.

The inner panel 11 is joined, below the roof panel 15, to a surface of a roof rail member 17 which is opposed to the upper portion of the side frame to delimit the closed space, and extends downward toward the floor. The inner panel 11 cooperates with the outer panel 6 to define the closed space.

As described above, the reinforcing panel 8 is disposed in the close space which is delimited by the outer and inner panels 6 and 11, so as to reinforce rigidity of the center pillar assembly against external force.

Also, an anchor nut plate 13 for fastening a seat belt anchor nut is placed between the reinforcing panel 8 and the inner panel 11, adjacent to the upper end of the center pillar assembly.

In the center pillar constructed as mentioned above, external force which is applied to the center pillar assembly is absorbed by the reinforcing panel 8 which is disposed in the closed space defined between the outer and inner panels 6 and 11.

Vehicle manufacturers are implementing aluminum as the material used for their vehicle body structures in order to reduce overall vehicle weight. Aluminum has different performance characteristics from the traditional Dual Phase Steel that is used in vehicle structures. However, in improving roof strength of a vehicle structure while reducing the vehicle weight, the inner panel 11 requires significant support as loads (such as roof loads) are applied on a vehicle structure.

Accordingly, there exists a need to provide adequate support to the inner panel 11 as it experiences loads incurred at the vehicle roof while at the same time, maintaining a low vehicle weight or reducing overall vehicle weight.

SUMMARY

A vehicle structural arrangement is provided according to the embodiment(s) disclosed herein. The vehicle structural arrangement of the present disclosure provides improved roof strength and controlled energy absorption when a load is applied to the roof structure of a vehicle. The vehicle structural arrangement includes an inner panel, an outer panel and at least one bridge member. The bridge member includes a first region, a second region, and a middle region. The middle region of the bridge member may be disposed between the first region and the second region. The middle region of the bridge member is also integral to the first region and the second region. The first region of the middle portion abuts the inner panel and the second region of the middle portion abuts the outer panel.

DETAILED DESCRIPTION

Figure 1:
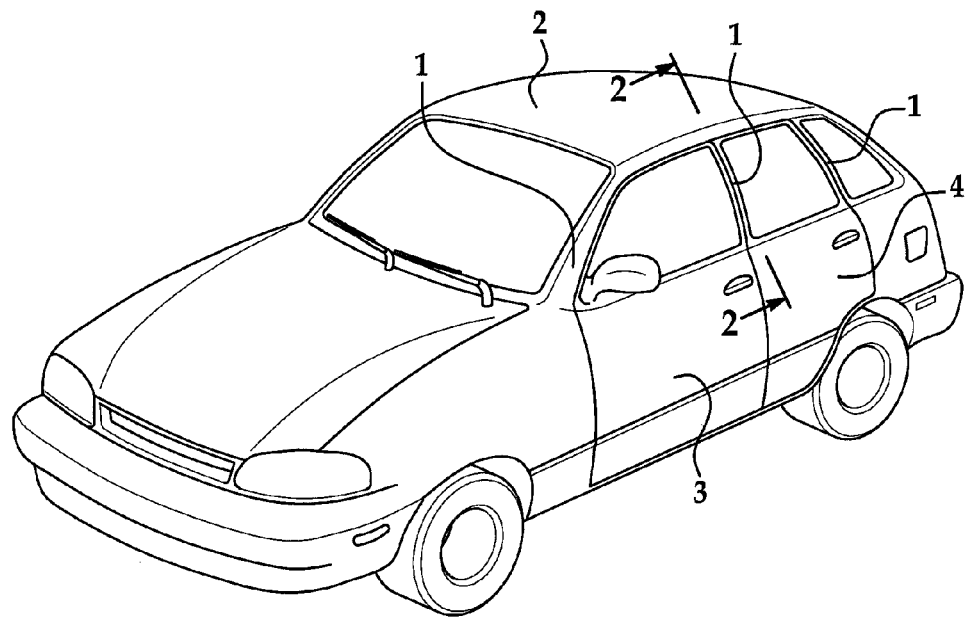
FIG. 1 is a perspective view illustrating an outer appearance of a motor vehicle.
Figure 2:
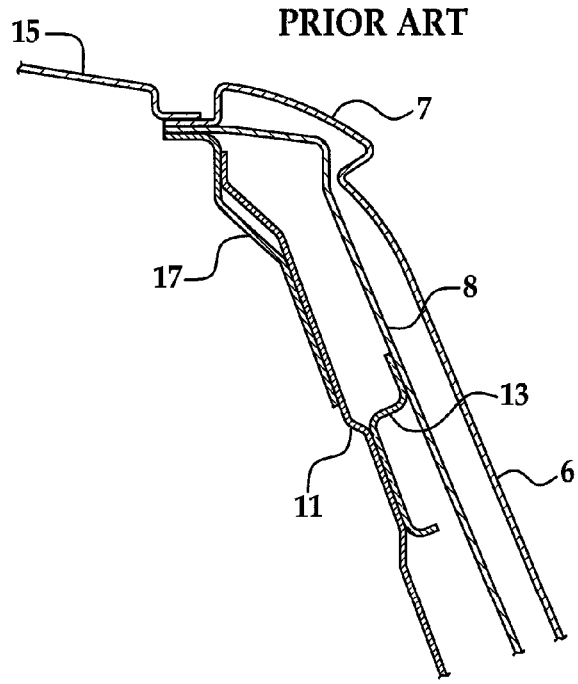
FIG. 2 is cross-sectional view taken along line H-H of FIG. 1, illustrating an upper part of a conventional center pillar assembly.
Figure 3:
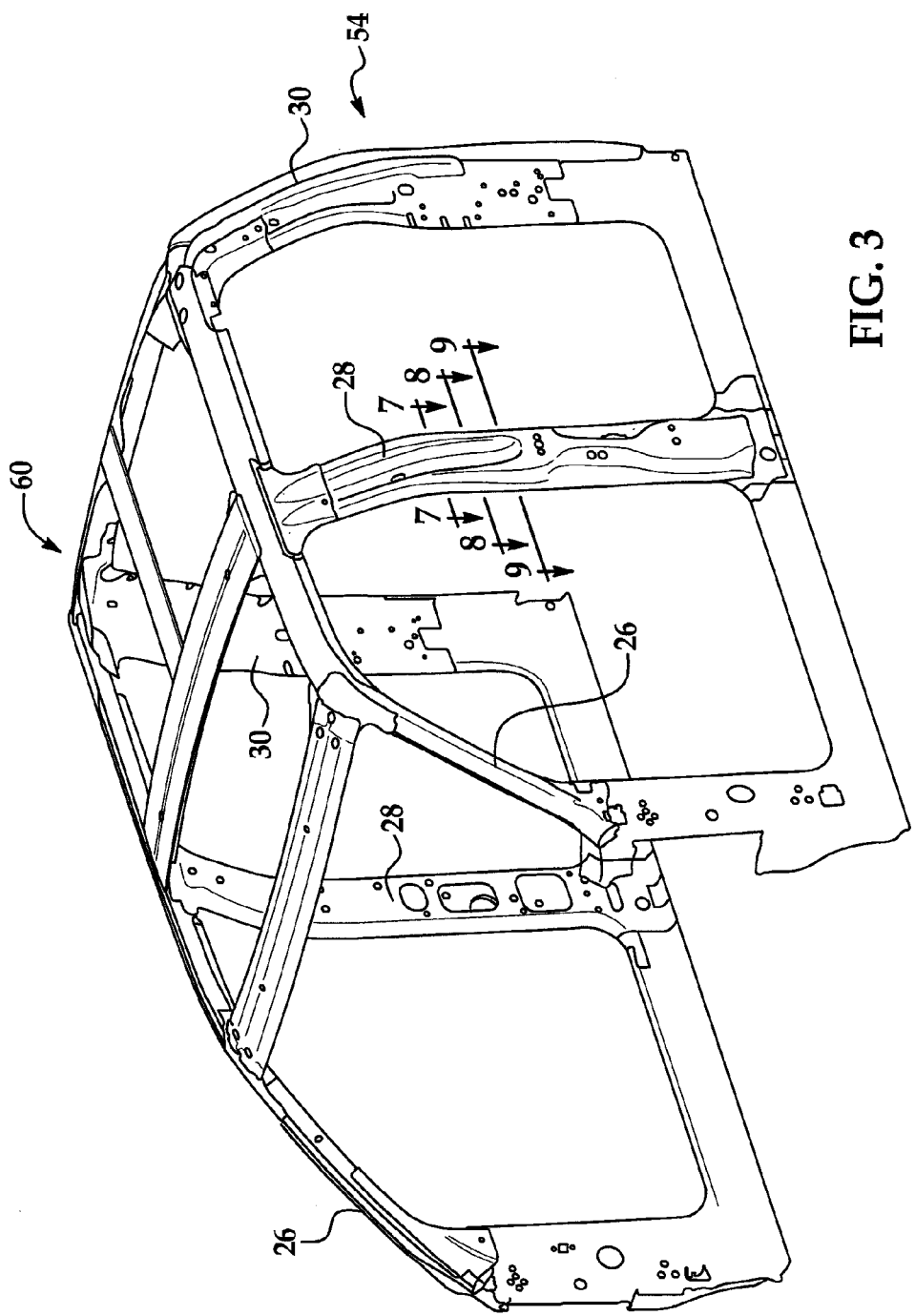
FIG. 3 is a partial, perspective view of an embodiment of a vehicle structure with two B-Pillars each having an, outer panel and inner panel.

A vehicle structural arrangement 10 is provided which provides improved roof strength and controlled energy absorption when a load is imposed on the roof structure. The vehicle structural arrangement 10 includes an inner panel 12, an outer panel 14 and at least one bridge member 16 having a first region 32, a second region 34, and a middle region 36. The inner panel 12 may be affixed to the outer panel 14 at the flanges 18 located at the lateral sides of each of the inner panel 12 and the outer panel 14 via welding (i.e. spot-welding), mechanical fasteners (i.e. self piercing rivets) or the like. An interior cavity 40 is formed by the inner panel 12 and the outer panel 14 wherein at least one bridge member 16 may be disposed within the vehicle pillar 20. It is to be understood that the vehicle pillar 20 may be an A-pillar 26, a B-pillar 28 or a C-pillar 30.

As shown in FIGS. 6-9, the thickness to width ratio of the structure is increased by adding in the bridge member thereby increasing the stiffness of the structure. However, the benefit of the vehicle structural arrangement 10 (shown in FIGS. 6-9) of the present disclosure is that this vehicle structural arrangement 10 provides reduced weight therefore providing reduced cost and improved vehicle fuel efficiency. Unlike traditional gloved arrangements where a reinforcement panel (not shown) may line almost the entire inner panel 12 surface area, the vehicle structural arrangement 10 uses less material and therefore provides a weight reduction benefit.

As indicated earlier, the bridge member 16 includes a first region 32, a middle region 36 and a second region 34. The middle region 36 may be disposed between the first region 32 and the second region 34 as shown in FIGS. 6-9. Furthermore, as shown in the non-limiting examples of FIGS. 6-9, the middle region 36 may be integral to the first region 32 and the second region 34. As shown in the non-limiting examples of FIGS. 6-9, the first region 32 of the bridge member 16 abuts the inner panel 12 and the second region 34 of the bridge member 16 abuts the outer panel 14.

It is to be understood that the first and second regions 32, 34 may or may not be affixed to the inner panel 12 and/or the outer panel 14 via a welding process, mechanical fasteners or the like. Also, as shown in the non-limiting examples of FIGS. 6-9, it is also to be understood that the middle region 36 of the at least one bridge member 16 may be substantially perpendicular to the first region 32 and the second region 34.

Figure 7:
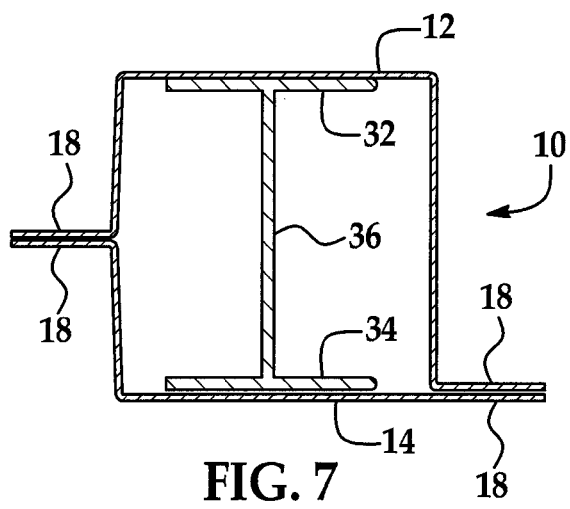
FIG. 7 is a cross-sectional view along lines 7-7 in FIG. 3 illustrating one embodiment of the vehicle structural arrangement of the present disclosure where one version of a structural bridge is positioned within a B-Pillar.

Referring now to FIG. 7, the bridge member 16 is shown in one non-limiting example as an "I" shaped member. The first region 32 abuts the inner panel 12 and the second region 34 abuts the outer panel 14. In this non-limiting example, the middle region 36 is integral to the first region 32 and the second region 34 in the middle area of each of the first region 32 and the second region 34.

Figure 6:
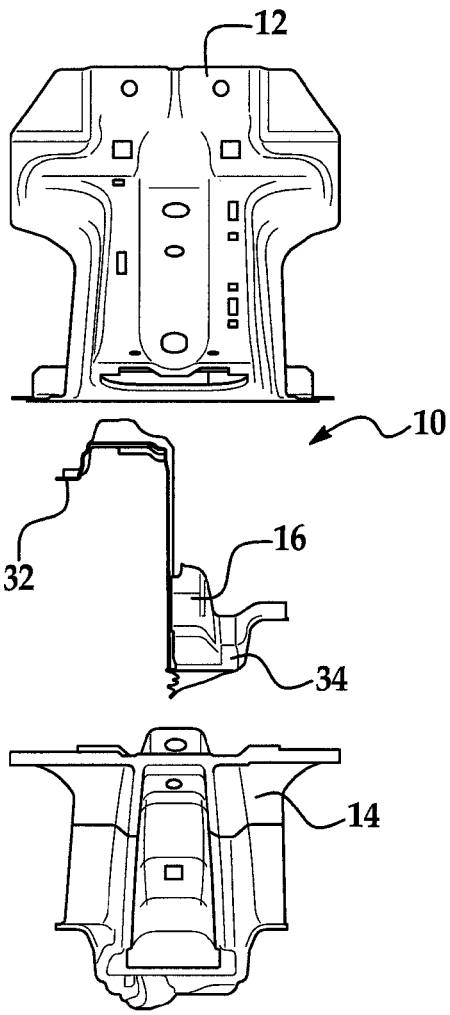
FIG. 6 is a top view of the expanded B-Pillar's inner panel and the B-Pillar outer panel where the B-Pillar's inner and outer panels are separated from one another and a structural bridge is positioned between the inner panel and outer panel.
Figure 8:
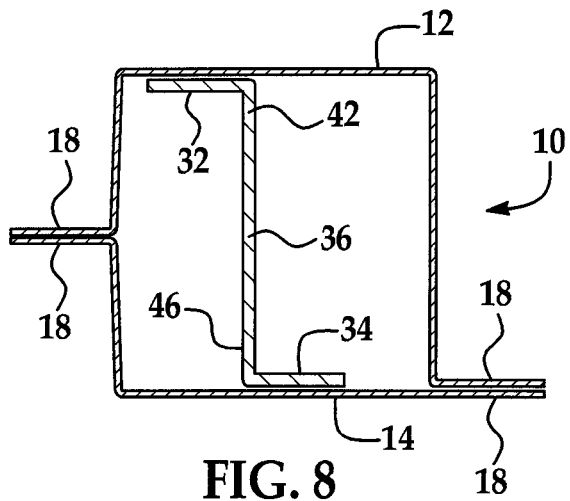
FIG. 8 is a cross-sectional view along lines 8-8 in FIG. 3 illustrating another embodiment of the vehicle structural arrangement of the present disclosure where another version of a structural bridge is positioned within a B-Pillar.

Referring to FIGS. 6 and 8, it is to be understood that FIG. 8 is a schematic of FIG. 6. As shown in both FIGS. 6 and 8, the bridge member 16 may be configured such that a first end 42 of the middle region 36 is integral to a first region end 44 of the first region 32 and a second end 46 of the middle region 36 is integral to a second region end 48 of the second region 34. Again, as shown, the middle region 36 is substantially perpendicular to the first and second regions 32, 34.

Figure 9:
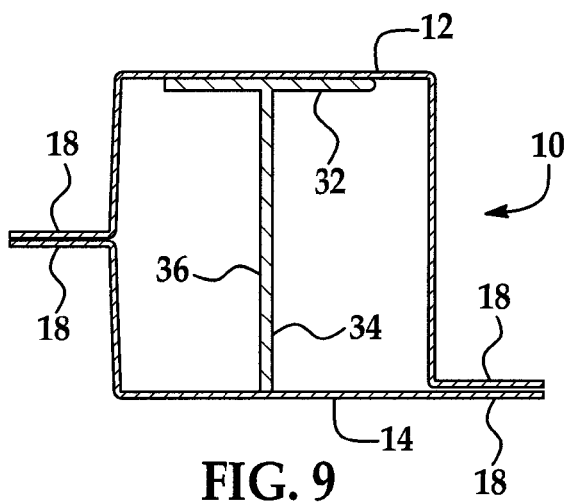
FIG. 9 is a cross-sectional view along lines 9-9 in FIG. 3 illustrating one embodiment of the vehicle structural arrangement of the present disclosure where yet another version of a structural bridge is positioned within a B-Pillar.

Referring now to the non-limiting example of FIG. 9, the bridge member 16 may be a "T" shaped cross section. The first region 32 may be perpendicular to the middle region 36 and the second region 34, in this non-limiting example may consist of the end of the middle region 36 that is proximate to the outer panel 14. As shown, in this embodiment, the middle region 36 is not perpendicular to the second region 34. The second region 34 however may abut against the outer panel 14 as shown in FIG. 9.

The pillar hinge joint 50, the at least one bridge member 16 affixed both above and below the pillar hinge joint 50, the inner panel 12, and the outer panel 14 are operatively configured to prevent the collapse of the inner panel 12 at a plurality of predetermined regions while providing controlled energy absorption at the pillar hinge joint 50. The inner panel 12, the outer panel 14 and the at least one bridge member 16 are formed from aluminum.

Figure 4:
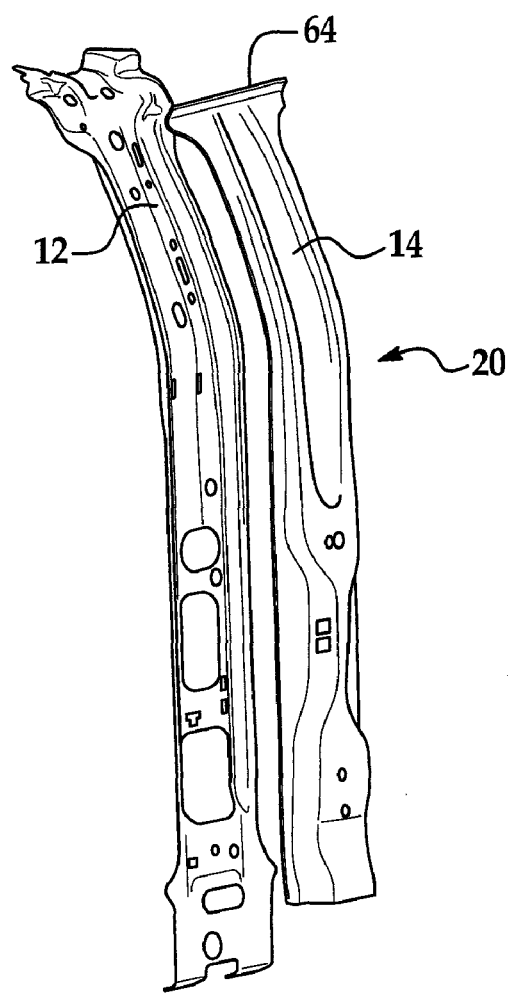
FIG. 4 is an expanded view of the B-Pillar's inner panel and the B-Pillar outer panel where the B-Pillar's inner and outer panels are separated from one another.
Figure 5:
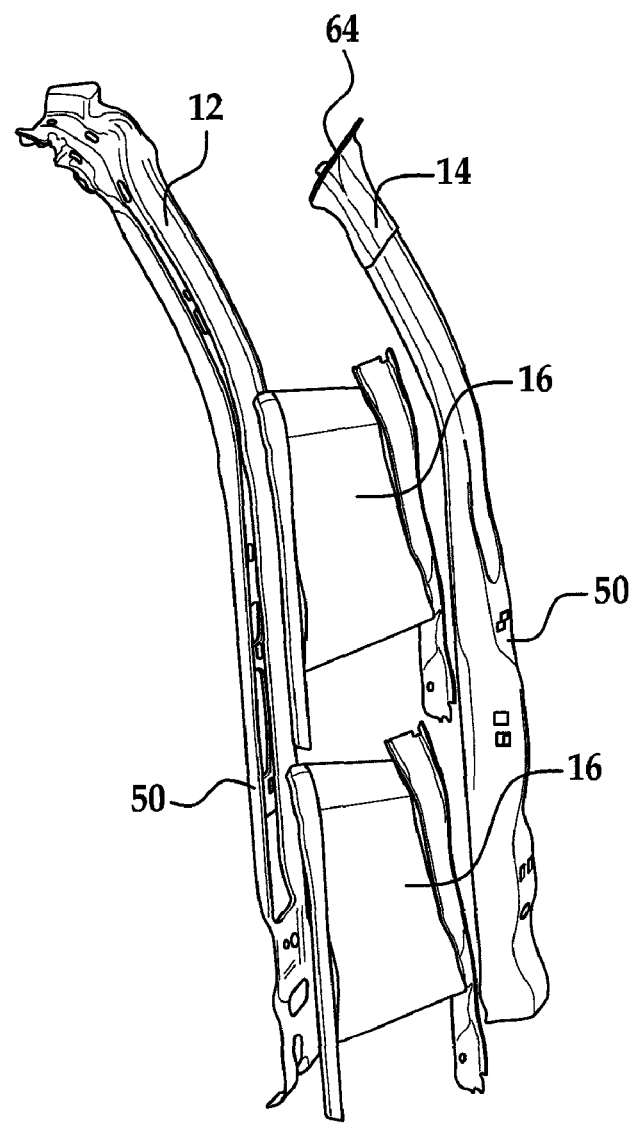
FIG. 5 is a side view of the expanded B-Pillar's inner panel and the B-Pillar outer panel where the B-Pillar's inner and outer panels are separated from one another and a structural bridge is positioned between the inner panel and outer panel.

It is to be understood that more than one bridge member 16 may be implemented along the pillar 20. In order to control the areas upon which the vehicle body structure 54 will absorb energy, bridge members 16 may be implemented about a pillar hinge joint 50 (shown in FIGS. 4 and 5) in order for energy absorption to occur at the pillar hinge joint 50. In one non-limiting example, a pillar hinge joint 50 may consist of a bending in the inner panel 12 and/or outer panel 14. Another non-limiting example of a pillar hinge joint 50 may be an aperture as shown in FIGS. 4 and 5. Regardless of the form of the pillar hinge joint 50, the pillar hinge joint 50 is operatively configured to function as a type of a crush initiator.

By implementing a bridge member 16 around the pillar hinge joint 50, energy absorption is controlled such that the pillar 20 absorbs energy at the pillar hinge joint 50. The bridge members 16 are operatively configured to reinforce the areas surrounding the pillar hinge joint 50 so that the energy is merely transferred to the desired pillar 20 area for absorption (in this case, the pillar hinge joint 50).

Therefore, multiple bridge members 16 may be affixed to the pillar 20. For example, a bridge member 16 (shown in FIG. 6 in phantom) may be affixed to the inner panel 12 below a pillar hinge joint 50 while another bridge member 16 may be affixed to the inner panel 12 above the pillar hinge joint 50. The bridge members 16 may be placed in multiple locations around the pillar hinge joint 50 and/or the belt line such that the bridge member 16 extends both below and above the pillar hinge joint 50 and/or belt line bending hinge zone. This arrangement is shown in FIG. 5. The embodiment of the vehicle structural arrangement 10 shown in FIG. 5 provides the pillar 20 with self stability through its multi-shaped cross section connectivity to both the inner and outer panels of the pillar 20. The attachment to the buckling inner panel 12 provides for a higher thickness to the inner panel width. This thickness to width ratio allows for higher critical stresses thereby improving the strength of the vehicle roof structure.

The vehicle structural arrangement also provides stability to the inner panel 12 of the pillar 20 (which is more likely to buckle when a roof load is applied). The improved stability is provided to the inner panel by lending the pillar's 20 outer panel's 14 stiffness to the pillar's inner panel 12 in and around the buckling zone of the pillar 20.

In the drawings and specification, there have been disclosed typical preferred embodiments of the invention and, although specific terms are employed, they are used in a generic and descriptive sense only and not for purposes of limitation, the scope of the invention being set forth in the following claims.

What is claimed is:
1. A vehicle structural arrangement comprising:
  an inner panel;
  an outer panel; and
  at least one bridge member having a first portion, a second portion and a singular middle portion substantially perpendicularly disposed between the first portion and the second portion, the at least one bridge member is affixed to the inner panel below a hinge pillar joint, the pillar hinge joint and the at least one bridge member being in a vertically central region of the inner and outer panels;
  wherein the first portion spans the width of the inner panel and the second portion spans the width of the outer panel.

2. The vehicle structural arrangement as defined in claim 1 wherein the at least one bridge member is affixed to the inner pillar above a pillar hinge joint in the vertically central region of the inner and outer panels.

3. The vehicle structural arrangement as defined in claim 2 wherein the pillar hinge joint, the at least one bridge member affixed both above and below the pillar hinge joint, the inner panel, and the outer panel are operatively configured to prevent the collapse of the inner panel at a plurality of predetermined regions while providing controlled energy absorption at the pillar hinge joint.

4. The vehicle structural arrangement as defined in claim 1 wherein the middle portion is integral to the middle area of the first portion and the middle portion is integral to the middle area of the second portion.

* * * * *